(12) United States Patent
Flanagan

(10) Patent No.: US 7,200,644 B1
(45) Date of Patent: Apr. 3, 2007

(54) PROXY INTERNET BROWSING

(75) Inventor: Tom Flanagan, Springfield, VA (US)

(73) Assignee: Texas Instuments Incorporated, Dallas, TX (US)

( * ) Notice: Subject to any disclaimer, the term of this patent is extended or adjusted under 35 U.S.C. 154(b) by 542 days.

(21) Appl. No.: 09/540,558

(22) Filed: Mar. 31, 2000

(51) Int. Cl.
  *G06F 15/16* (2006.01)
(52) U.S. Cl. ...................... 709/219; 709/227
(58) Field of Classification Search ............... 709/220, 709/217–219, 223–226; 463/42
  See application file for complete search history.

(56) References Cited

U.S. PATENT DOCUMENTS

| | | | | |
|---|---|---|---|---|
| 5,043,860 | A * | 8/1991 | Koether et al. | 700/9 |
| 5,727,159 | A | 3/1998 | Kikinis | 395/200.76 |
| 5,861,883 | A | 1/1999 | Cuomo et al. | 345/326 |
| 5,875,430 | A * | 2/1999 | Koether | 705/1 |
| 6,119,167 | A * | 9/2000 | Boyle et al. | 709/234 |
| 6,121,593 | A * | 9/2000 | Mansbery et al. | 219/679 |
| 6,229,433 | B1 * | 5/2001 | Rye et al. | 340/310.01 |
| 6,368,177 | B1 * | 4/2002 | Gabai et al. | 446/404 |
| 6,446,111 | B1 * | 9/2002 | Lowery | 709/203 |
| 6,496,575 | B1 * | 12/2002 | Vasell et al. | 379/102.05 |
| 6,587,879 | B1 * | 7/2003 | Reynolds | 709/224 |

FOREIGN PATENT DOCUMENTS

EP  0965934 A2 * 12/1999

OTHER PUBLICATIONS

Dutta-roy, Amitava, Networks For Homes, Spectrum, Dec. 1999, pp. 26-33.
Huhns, Michael N. Networking Embedded Agents, Inernet Computing, Jan.-Feb. 1999, pp. 91-93.

* cited by examiner

*Primary Examiner*—Jeffrey Pwu
*Assistant Examiner*—Joseph E. Avellino
(74) *Attorney, Agent, or Firm*—Steven A. Shaw; W. James Brady; Frederick J. Telecky, Jr.

(57) ABSTRACT

The present invention provides proxy browsing on the Internet 16 whereby the user interface of one device, such as a personal computer 10 with a Web browser, causes servers 14 to interact with alternate client devices 20, 24 linked to the Internet 16 that are remotely located from the personal computer. A user may activate a proxy browser on a PC 10, select one or more files or commands from a Web server 14, and download the files or commands directly from the servers to client devices 20, 24.

A user of a Web browser 26 may locate and download by proxy a digital sound file stored on a Web server 40 to play on a series of networked digital speakers 54. The user of a Proxy Browser 26 may select a recipe stored on an Web server 40 and send the recipe that has embedded commands to configure networked home appliances 52 to the correct cooking modes. Digital video players 50 and children's toys 48 comprise further examples of client devices capable of receiving files by proxy with embedded commands or controls, or multi-media files. The user of a Proxy Browser may also select files 60 or Web pages 62 from the Internet 38 and download them to a third party's client PC or Web browser 58.

9 Claims, 6 Drawing Sheets

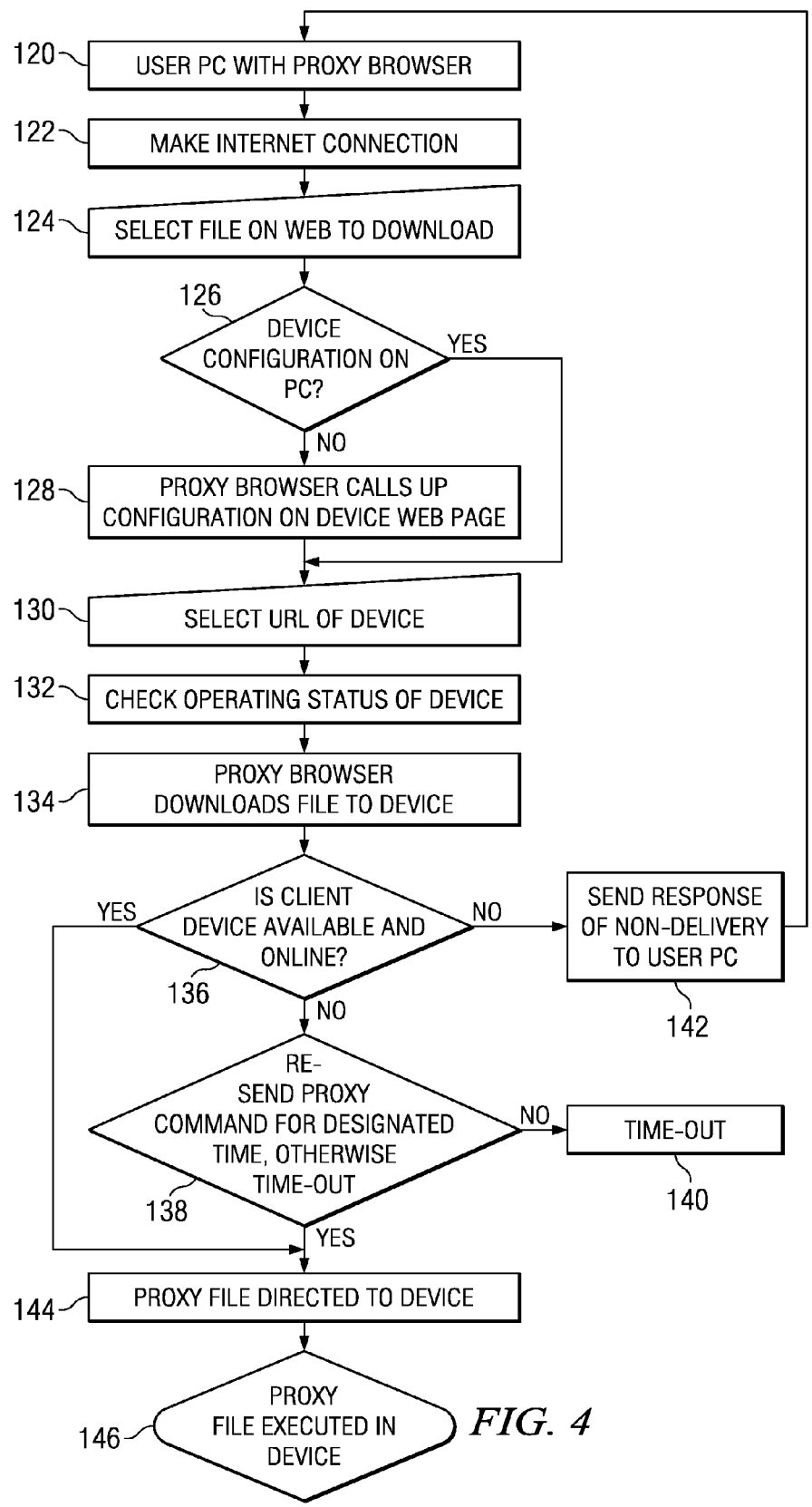

PROXY INTERNET BROWSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Integrating the Internet (and other networks using internet protocols and techniques such as an Intranet or Extranet) into home and business life has increased dramatically in the past decade. Since the widespread access and use of Internet browsers, the Internet has steadily grown into areas of communication, commerce, and research. New uses for the low cost and wide access of the Internet are replacing or enhancing traditional lifestyle functions, such as shopping, communicating, and audio and video entertainment.

The widespread adoption of the protocol for file transmission over the Internet, Transmission Control Protocol/Internet Protocol (TCP/IP) and the related UDP/IP, is a major factor in the rapid growth of the Internet. The IP protocol controls the routing of data and the TCP or UDP protocol controls the transfer of data. TCP/UDP/IP provides a common means of interconnection through packet transfer devices known as gateways, bridges, routers and switches. These devices are specialized Internet working computers that connect two or more networks and route packets of data between them.

Each direct connection to the Internet requires a unique numerical address. Every device or user that connects directly to the Internet must obtain an IP address from the Network Information Center (NIC). IP addresses only specify a connection to the Internet, not what type of connection or the type of hardware connected.

Interacting with the TCP/UDP/IP and PPP network software is the HTTP server. The HTTP server is a software program with which a Web browser communicates to access information and send commands, files, and media streams of digitized audio and video to computers and specialized network attached appliances (wired or wireless) via the Internet or similar IP network. The target computers or appliances are collectively referred to as clients. The HTTP server responds to external requests by transmitting the appropriate Web pages of information and hypertext connections or in the case of audio or video by transmitting the appropriate media stream. The HTTP server also responds to external requests to perform a specific action associated with a button or control on the target appliance.

In response to external requests the HTTP server transmits Hypertext Markup Language (HTML) pages describe what the Web browser will display on the screen at the remote terminal, including buttons, text, images, animated real time streams of images, sounds, and so forth. HTML pages may be directly encoded in software.

With respect to handling requests, commands, and information including data transfers relative to end-user appliances, certain hardware and software is contained in each appliance. For receiving information, appliances may connect directly to the Internet or connect to a local server with an Internet connection, or Web server. A TCP/UDP/IP stack acts on a received request or command by performing a number of functions. A received command or packet of file data has an IP address associated with it. The TCP is responsible for controlling the structure and flow of the received information and providing extensive error checking and flow control to ensure the successful delivery of data where as UDP packets delivery is not assured. The transport layer of TCP/UDP serves as an interface between network applications and the network, and it provides a method for addressing network data to particular applications. In the TCP/UDP/IP system, applications can address data using port numbers. A port is a predefined internal address that serves as a pathway from the application to the transport layer or from the transport layer to the application. A port address combined with an IP address creates a socket in a computer system. The TCP/UDP/IP stack is associated with a number of sockets that it communicates with or links to, with the selected socket being dependent upon the content of the received information.

A Web server fills one of the socket locations available to the TCP/UDP/IP stack on a client PC or appliance. A Web server operates in HTTP format in response to requests from a user's PC machine and reading to and from electronic appliances. The Web server gains or posts information according to received requests or data. The server controls the connections of each appliance or computer to the Internet. In addition to communication with the data memory, the Web server is operatively linked to a CGI-bin. The CGI-bin acts as a link or a gate to a number of typically short executable programs stored in program memory. JAVA applications or appletts are used in a fashion similar to CGI-bin to allow client applications that are more complex than the display of HTML encoded WEB pages.

Audio and video streams must be digitized prior to transmission over IP networks and the digitized information is often compressed in order to conserve network bandwidth and reduce transmission time. Technology commonly referred to as audio or video "players" are installed as software on the client computers and appliances. These players are responsible for decompression and decoding the media streams and for managing the playout of the media using a combination of display devices and audio devices such as video screens, televisions, speakers and headphones. Players may be incorporated (commonly known as a "plug-in") within browsers or function as specialized browsers interacting directly with servers. Thus, when a browser or player requests an audio or video stream from a server, the server transmits the stream and the browser/player operating within the client device decodes and displays and/or plays the audible media stream.

SUMMARY OF THE INVENTION

The present invention provides Internet browsing by proxy whereby the user interface of one device, such as a personal computer (PC) with a Web browser, causes servers to interact with As alternate client devices linked to the Internet or similar network that may be remotely located from the PC. A user may activate a Proxy Browser on a PC, select one or more files, media streams, etc. from a Web server, and download files directly from the servers to alternate client appliances or computers. The client appliances in the present invention may or may not have their own Web browsers.

Practical examples of Proxy Browser uses include cooking, entertainment, and Internet utility applications. The user of a Proxy Browser may locate and download or stream by proxy a digital music file stored on a Web server to play on a series of digital speakers that are linked to the Internet. The user of a Proxy Browser may select a file to download that contains a cooking recipe with embedded commands to configure networked appliances to the correct cooking modes. Digital video players and children's toys or games comprise further examples of client devices capable of receiving files by proxy to play or control the client appliance.

The Proxy Browser may exist on a user's personal computer or workstation with configuration files located local or remote from the program. Commercially available Web browsers such as Microsoft Explorer or Netscape Navigator have the ability to accept plug-in programs that integrate normally separate programs to launch within the browsers when needed. The Proxy Browser may launch as a plug-in program to a browser or player, exist separately but used with a browser or player, or exist as its own separate program.

BRIEF DESCRIPTION OF THE DRAWINGS

For a better understanding of the nature of the present invention, reference is had to the following figures and detailed description, wherein like elements are accorded like reference numerals, and wherein:

FIG. 4 is a general flow chart of the Proxy Browser process;

DETAILED DESCRIPTION OF PREFERRED EXEMPLARY EMBODIMENTS

Figure 1:
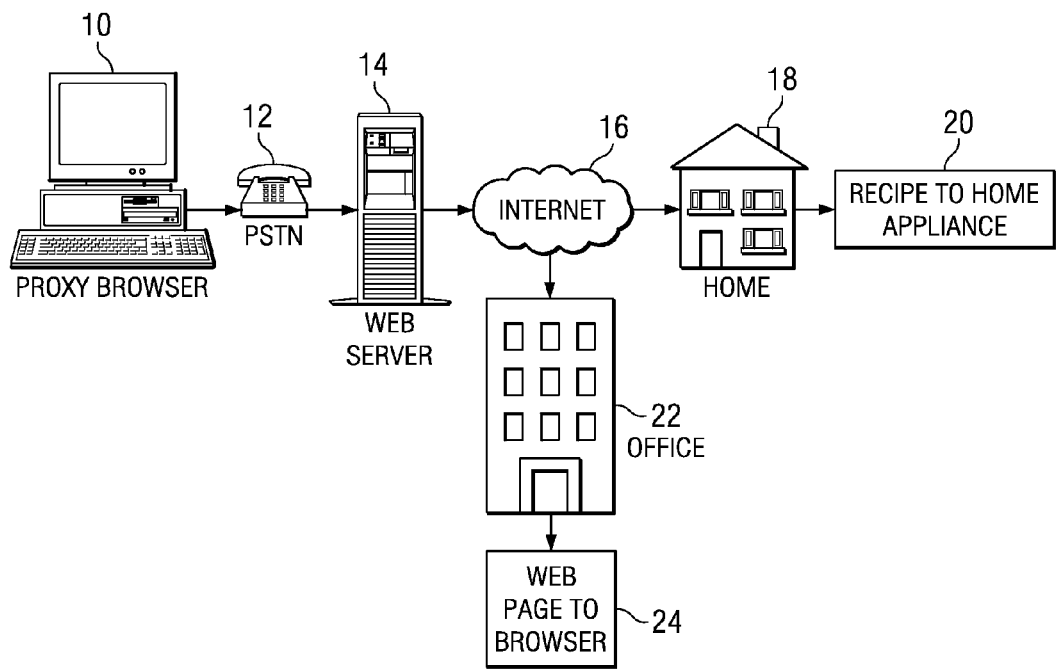
FIG. 1 is a flow diagram illustrating the general operational flow of Proxy Browser.

Referring to the several illustrations represented in the figures, there is depicted in FIG. 1 a general schematic of the Proxy Browser process. A user invoking the Proxy Browser may access the Internet on a computer and download files and Web pages to other computers or devices that are linked to the Internet without intervention by the receiving device. The Proxy Browser resides on a computer as a program with associated library, execution, setup, and configuration files. The program can either be an independently executable program or integrated as a plug-in to an Internet browser. The Proxy Browser integrates with, or executes commands for, any Internet browser located on the user's computer.

FIG. 1 illustrates a user's computer, a personal computer (PC) in this example 10, connected to the Internet 16 and a Web server 14. In an exemplary preferred embodiment of the invention, the user 10 may browse the Internet 16 in a normal execution mode using a commercial Web browser program and activate the Proxy Browser 10 as desired. The Web server 14 acts as a gateway for a user's connection to the Internet 16. The user may locate a file to download from the Internet to a different client computer or appliance that is linked to the Internet 16. FIG. 1 illustrates a recipe file sent by proxy to a home 18 network that downloads to a cooking appliance 20. The recipe file 20 contains embedded cooking commands that configure the appliance for cooking the recipe. FIG. 1 also illustrates an example of the Proxy Browser 10 use in a commercial business. A customer service representative may have a Proxy Browser loaded onto a PC. A business calling the customer service with product-related questions could have Web pages with the appropriate product information from the Proxy Browser sent to third-party client computers located anywhere reachable via the network.

Figure 2:
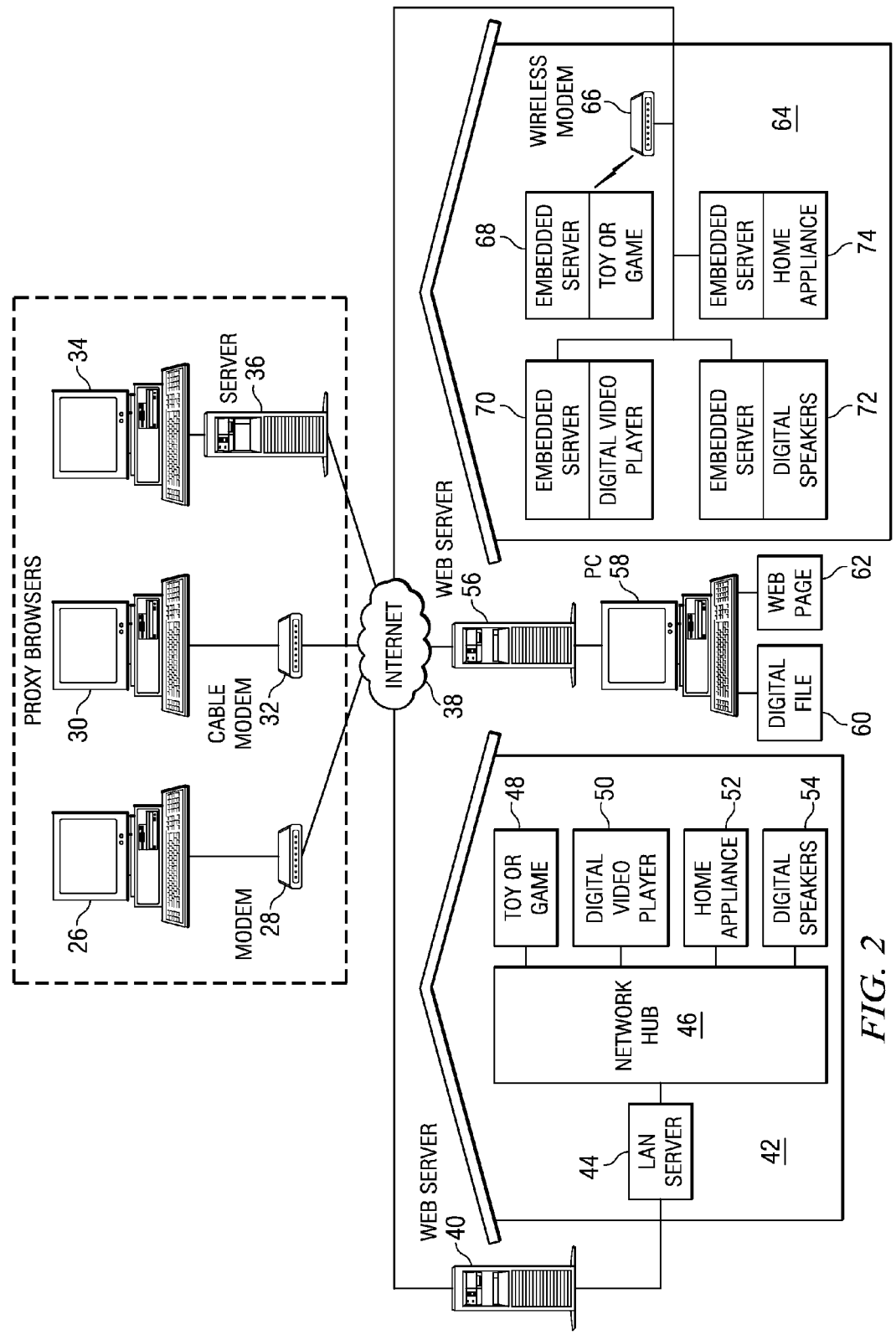
FIG. 2 is a network diagram with Proxy Browser operations.

FIG. 2 illustrates exemplary preferred embodiments of network connections of Proxy Browsers, client appliances, or computers. Proxy Browsers 26,30,34 from different locations may send files through the Internet or similar network 38 to a network 42 having a LAN server 44 and network hub 46, such as a home network having appliance and entertainment appliances, or to a network 64 having appliances and devices with embedded operating systems and Internet server capabilities. A client computer 58 that is not on-line to the Internet 38, may also receive downloads through a Proxy Browser 26. Various data links known in the art may link electronic appliances to the Internet, such as network interface cards, embedded Internet servers, or connections through a proxy-server. Linking to the Internet includes, but is not limited to, connecting directly into data or telephone lines, through a LAN server within the home or office, through a dial-up modem into analog or digital lines from a local telco, cable modems, and wireless or satellite links.

A user's computer 26 containing the Proxy Browser may connect to the Internet through means known in the art, for example a modem 28, cable modem 32, or network server 36. There are no strict requirements for location of the Proxy Browser located on a remote computer. In an alternative exemplary embodiment, a Proxy Browser may incorporate into wireless hand-held computers or personal assistant computing devices. The Proxy Browser 26 connects to the Internet 38, containing a plurality of Web servers all over the world. The Web server 38 receives commands from the Proxy Browser 26 to send a file or Web page to a specific client on a network 42. In response, a file from the Web server 38 is sent via the network to the local area network (LAN) server 44. The LAN server 44, and client appliances 42, are linked to their own Web server 40, which may or may not be the same as the LAN server 44. Each computer or appliance linked to the Internet in FIG. 2 has its own unique Internet address, and may also have a Uniform Resource Locator (URL) that equates a name to its IP address. The URL is used in the preferred embodiment to send and receive proxy files and data over the Internet. A LAN server 44 also communicates with, or links to, a network 42 of machines and devices through a TCP/UDP/IP stack with associated socket identification numbers. The LAN server 44 operates in HTTP format in response to commands from a Proxy Browser 26. The TCP/UDP stack for each appliance that is not Internet-enabled is handled by the LAN server 44. The IP recognizes the source and destination addresses of the downloading file. The LAN server 44 uses an application-specific addressing scheme to address each attached device. When the Proxy Browser 26 forms a connection with a Web server 38 on the Internet and invokes a Proxy Browser session, the Proxy Browser 26 may direct a download command to a Web server 38 to send the download file to the attached appliance's application specific address.

As an alternative exemplary embodiment, FIG. 2 illustrates a LAN 64 with devices 68, 70, 72, 74 that contain operating systems with embedded Internet capability. Embedded Internet is an enhanced level of communications in a device that typically incorporates an operating system and TCP/UDP/IP and allows the device itself to process HTTP files as client server. The embedded Internet includes a Web server, communications protocol, and user interface. The Web server will serve Web pages using HTTP and other internet protocols such as those used with streaming media. The operating platform is compact, scalable and offers a Web browser as a front-end for various functions for information appliances and network terminals. Information can be stored in flash memory, and more detailed information can be further obtained by the embedded URLs when connecting to the Internet. Consumer electronics and appliances with small memory footprints and different input methods such as touch panel, remote control, standard buttons or keys can run embedded Internet. The appliances of the system often include a number of small executable Common Gateway Interface (CGI) and/or JAVA programs. The CGI/JAVA programs provide an interface between the HTML pages and the hardware and software of the appliances. The CGI/JAVA programs communicate with the appliances, asking the appliances to perform actions or provide requested information such as images, reports, or current status. CGI/JAVA programs are typically stored on an appliance's hard disk or flash memory or may be transmitted to the appliance via a network. Appliances for this type of system have some type of display, network interface, operating system, and TCP/UDP/IP network protocols that can be run through a local area network (LAN) or Internet connection. Embedded systems may include devices such as home electrical appliances 74, digital speakers 72, digital video players 72, and children's toys or games 68. As an illustrative alternative embodiment, toy or game 68 illustrated has a wireless modem to allow free movement of the device without losing an internet connection. Any of the devices 64 illustrated in FIG. 2 could have wireless connections, and the embedded servers of appliances may integrate a wireless modem to give the devices portability.

The proxy transmission of a file from an Internet server sends the file via TCP/UDP/IP to an appliance that acts as a third processor in the session. The appliance has a processor of its own, but it typically does not have an Internet browser interface. The processor within the appliance performs the necessary functions to decode the downloaded file and output a signal or command to other media or controls in the appliance. A preferred exemplary embodiment of the Proxy Browser 26 is downloading a recipe file containing cooking instructions with embedded control code from a Web page 38 to an oven 52 that is linked to the Internet 38, and as a result, the oven is configured to cook food according to the recipe instructions. In another preferred exemplary embodiment, a user with a Proxy Browser 26 may select digital audio files residing on an Internet server 38, and by activating the Proxy Browser 26, the music file streams as a download to play on one or more networked speakers 54. Similarly, a user may select a digital video file from a Web server 38, such as a cinematic movie, and download the file to play on a digital video player 50. The Proxy Browser 26 may send a command for a Web server 38 to send an audio, video, or program file to a child's toy or game 48 linked to the Internet 38. For example, an electronic board game may have different configurations for its theme, strategies, setup, and players. An alternative exemplary embodiment or an electronic toy story book 48 could narrate different stories and provide multi-media graphics illustrating story characters.

In a preferred exemplary embodiment shown in FIG. 2, the Proxy Browser 26 may download Web pages from Web servers 38 to a remote third-party PC 58 or network server 56. The Proxy Browser 26 may send an HTML Web page to open on the client PC's 58 Internet browser or save the HTML file to a PC's 56 writeable memory or other storage for later viewing by the browser on the client PC 56.

The Proxy Browser 26 may also download files by proxy to client PC's 58, either in a network or individually connected to the Internet. A PC 58 may act as its own Web server, but far more typical is the PC 58 accessing the Internet through a separate Web server 56. The client PC 62 in the embodiment does not need to communicate directly with the Proxy Browser 26. The user's PC 26 invokes the Proxy Browser when a file or command sequence is found on an Internet server 38. The Proxy Browser 26 may designate a file located on an Web server 38 to download to the client PC's 56 hard disk and begin an FTP session. The Proxy Browser 26 has a client computer's URL and hardware and software configurations saved in memory. A useful application of a preferred exemplary embodiment includes a customer service representative running a search for topical information on the customer's inquiry, then using a Proxy Browser to send files or Web pages from an Internet server directly to a customer's PC of the results of the search.

The ability to send files and commands via Proxy Browser depends upon the connectivity of the receiving device when the command is sent. The Proxy Browser may cache a download command on Web server or the user PC if the URL of a receiving device or computer is not available. Data downloaded from Internet servers according to the commands entered by users of the Proxy Browser may be temporarily stored on either the Proxy Browser's device Web page's server or the Internet server through which the receiving computer or appliance is connected to the Internet. The files may be sent to the client device at a later time when is the device is back on-line to the Internet.

In a preferred exemplary embodiment, the Proxy Browser has configuration files set up for each linked appliance and computer. These files may be created by the user or dynamically by a program or routing function. An appliance connected the Internet has an IP address/URL attached to data packets sent and received by the appliance to and from the Internet. This address is entered into a configuration setting for the Proxy Browser to send data, Web pages, files, or executable program commands to the client device through the Internet. The configuration files may specify information such as connection status, device system protocols, device address or URL, device type, and any special connection or program execution protocols including logical switches that are normally on or off. For example, an oven's range of operating parameters may include on/off mode, current status or temperature measurement data, range of control options, and timing modes. FIGS. 3A to 3D illustrate exemplary embodiments of four configuration file locations for the Proxy Browser. Configuration files may be located either in the memory of a user's PC or LAN server, on a user's Web page, on a client's Web page or Web server, or within the memory of the client devices themselves. The configuration settings are read by the Proxy Browser prior to sending a file to a remote appliance or computer.

Figure 3A:
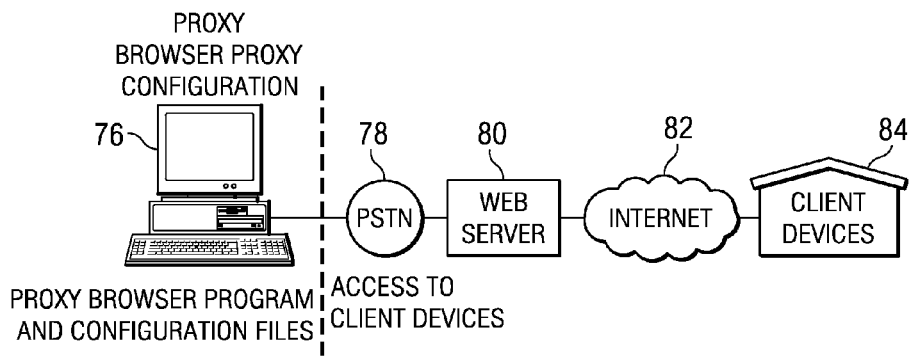
FIGS. 3A–3D are diagrams illustrating different configuration file locations for the Proxy Browser.

In FIG. 3A, a preferred exemplary embodiment is illustrated with a Proxy Browser located on a user's PC 76. The configuration files are located on storage media located on the PC, such as a hard drive. In an alternative exemplary embodiment, the PC is networked into a LAN, wherein the Proxy Browser and configuration files are located on the LAN server. A third alternative embodiment of FIG. 3A has the Proxy Browser located on the PC with configuration files located on a LAN server. Any of the alternative embodiments for FIG. 3A locate the Proxy Browser and associated the configuration files prior to accessing the PSTN 78, a Web server 80, the Internet 82, and finally the client devices 84.

Figure 3B:
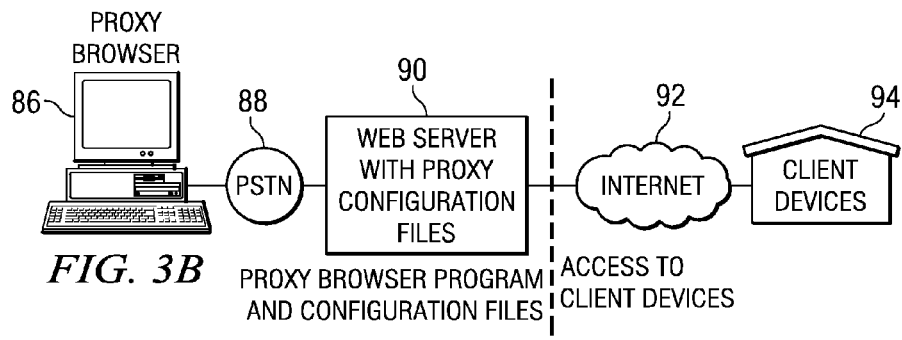
Figure 3C:
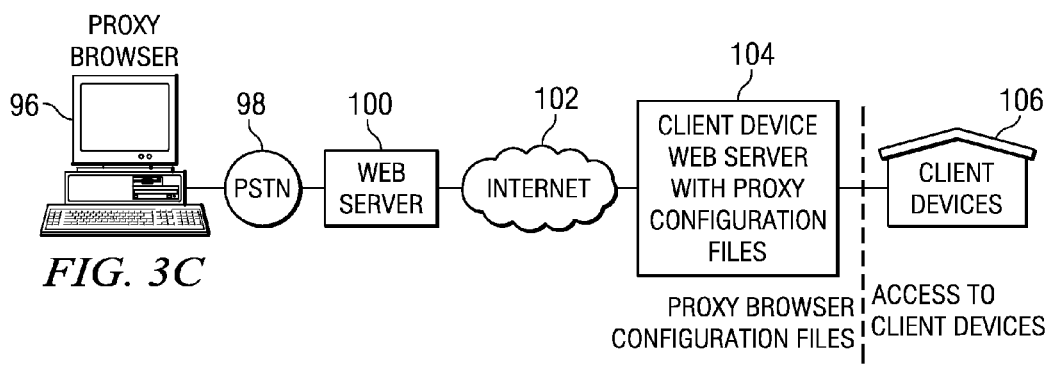
Figure 3D:
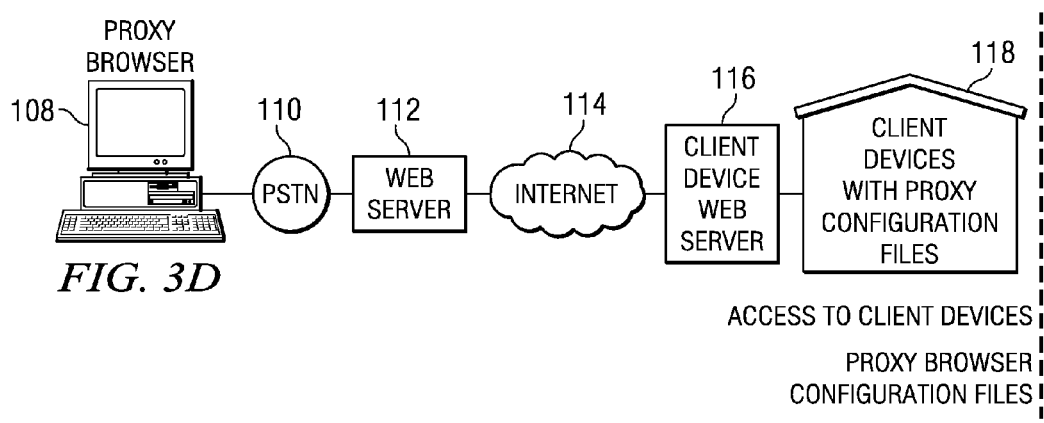

FIG. 3B illustrates an alternative exemplary embodiment having a PC 86 with the Proxy Browser located on the PC, and the client device configuration files located on the User's Web page 90, which is either located on a Web server or a LAN server with Internet access. The embodiment places the files on the Internet 92, where they may be accessed from any location that has Internet access. FIG. 3B illustrates the Proxy Browser PC 86 accessing the configuration files on an Internet provider's Web server 90 through the PSTN 88 with a dial-up system, then accessing the Internet 92 to transmit files to client devices 94. An alternative exemplary embodiment illustrated in FIG. 3C placing the device configuration files on an Internet 102 Web server 104 used by the client devices 106 to access the Internet 102. The clients 106 may access the Internet directly if the Web server 104 is also the client's LAN server. The configuration file 104 may be accessed and changed at any time by the user with a Proxy Browser 96 via the Internet. FIG. 3D illustrates an alternative exemplary embodiment of client configuration information located in the memory of client devices 118 themselves. Each client device 118 has either embedded Internet servers 64 or has memory available in its own processor system to hold the configuration settings in a file format readable by the Proxy Browser 108 when the Browser accesses the Internet 114 through the PSTN 110 and a Web server 112.

Figure 5A:
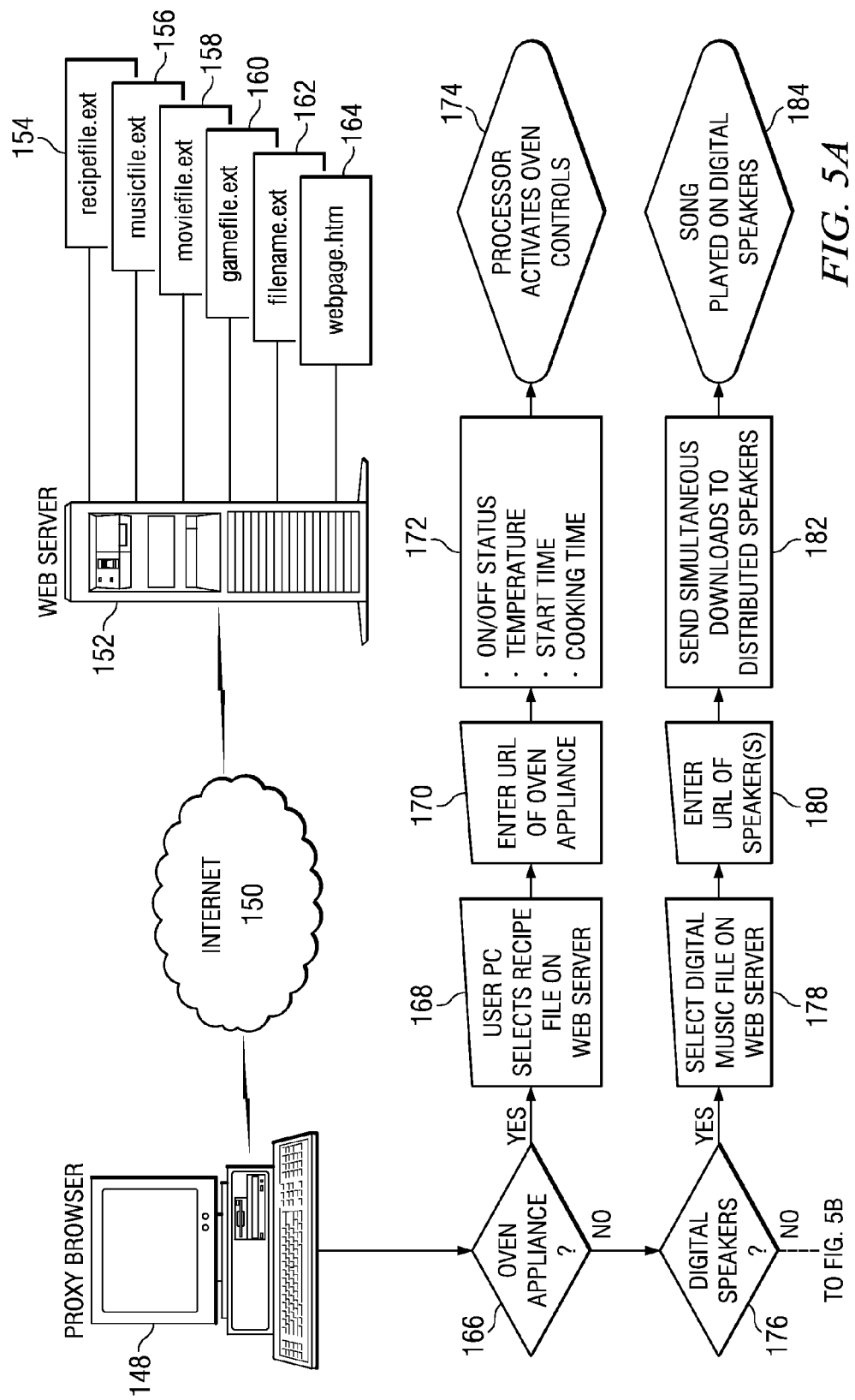
FIG. 5 is a summary flow chart of alternative embodiments of the Proxy Browser process.
Figure 5B:
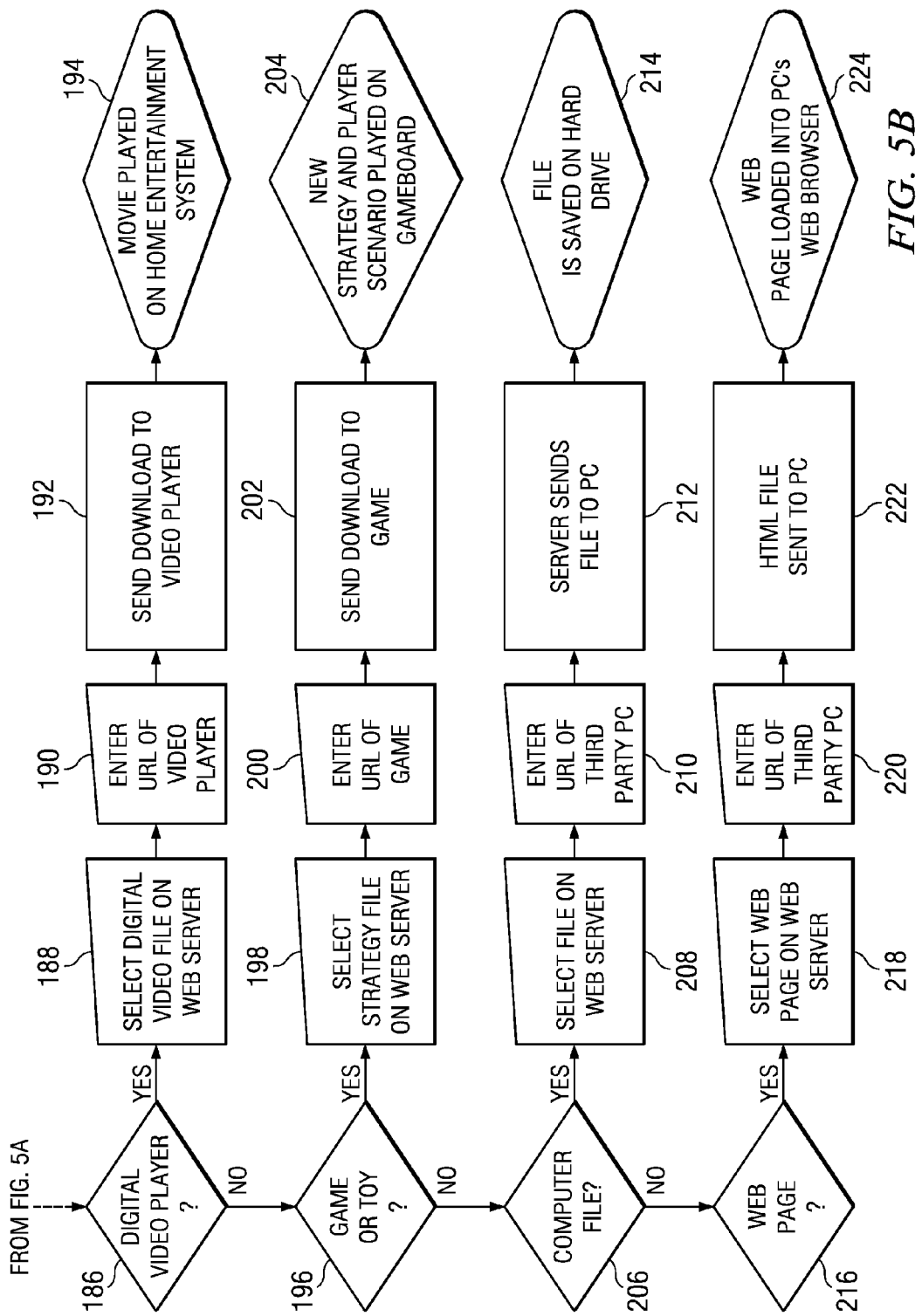

FIGS. 4 and 5 are flow diagrams illustrating exemplary steps made by a user to transmit commands through the Proxy Browser to a client device via the Internet. FIG. 4 illustrates the general steps for the system, and FIG. 5 illustrates specific exemplary preferred embodiments of Proxy Browser sessions. In FIG. 4, the user PC initiates a Proxy Browser session 120 and makes an Internet connection 122. The user selects a file from an Internet server or a Web page to download to an alternative client appliance or computer 124. The Proxy Browser searches for configuration files for all devices that have been pre-configured for the browser 126. If the files are not found locally, the Proxy Browser sends a query to a Web page or the client appliance 128 or device. The user 120 then either selects from a list of saved URLs or IP addresses for each device or enters a new URL 130 and records the type and name of the client device. The Proxy Browser may optionally send a ping or query to the device to check its operational status and to check that the correct appliance URL or IP address has been entered 132. This step is optional because the Proxy Browser does not require verification of the URL of the client device to send a file or command by proxy. While TCP/IP has its own error-checking protocol, the Proxy Browser optionally may check for transmission and addressing errors through its own software functions. The only option left to check is a basic routing of the file, whether it is transmitted to the device's embedded Web server or through a device's external Web server. The server determines the correct TCP socket assigned to the device and transmits the proxy file through to the device's networking interface.

The next step is a query to determine if the client device is online to the Internet and available to receive proxy files 136. If the client device is not available, the Proxy Browser has two options. The first option is to re-transmit the proxy command to the client device for pre-programmed span of time 138. If the transmission is not received and acknowledged by the client device, the command dies in a time-out 140. The second option is to send a response message to the user PC that the proxy command was undelivered and query the user if the command should be re-sent 142. When the transmitted file reaches the device or computer, the file is saved or executed depending upon the type of client device.

Decisional steps of exemplary preferred embodiments for a Proxy Browser to send commands to an Internet server and have the server download files or web pages to client appliances or PCs are illustrated as a flow chart in FIG. 5. A user logs the PC having a Proxy Browser 148 onto the Internet 150 and searches for files to download. When a file or Web page of interest is located, the user initiates a Proxy Browser session. FIG. 5 illustrates Web pages 154–164, each with the following different types of files:

recipefile.ext—a recipe file with embedded oven commands 154;
musicfile.ext—a digital music file 156;
moviefile.ext—a digital full-length movie 158;
gamefile.ext—a new configuration for board game 160;
filename.ext—a generic file to download and save 162;
webpage.htm—a Web page HTML file to download into a browser 164.

The user on the Proxy Browser 148 may select the a software file to download to its compatible appliance or computer. FIG. 5 lists exemplary preferred embodiments of proxy download sessions in the decision tree, starting with an oven appliance 168. The user locates a recipe file 154 on the Internet for food to cook in an oven. The user opens a Proxy Browser 148 and selects the recipe file 168 to download to an oven 166 that is linked to the Internet. The recipe file 154 has embedded code in its recipe directions, which the oven's processor 166 decodes and translates into baking configurations. Prior to downloading the recipe file 154, the user either enters the oven's URL address 170 into the Proxy Browser, or the Proxy Browser reads the URL from a saved configuration list. The recipe file commands can configure the oven's on/off status, baking temperature, start time, and cooking time 172 according to the needs of the user and the recipe. Once the correct parameters of the receiving device are determined by the Proxy Browser, a status check 172 of the device may be performed by the browser including sending a ping to the oven to determine if it is turned on and located at the correct URL or IP address. If the oven is already in use, and if the oven is functioning properly according to the device's self-monitoring program. The status check would next determine if the baking temperature and time as specified in the online recipe needs to be adjusted for internal factors such as a gas versus an electric or convection oven, and external factors such as altitude and humidity. The internal oven's processor may adjust the recipe commands to account for any changed parameters from the oven's standard configuration. After the oven's microprocessor decodes the recipe commands, the processor activates the oven's temperature and baking controls accordingly 174.

If a user desires to download music into digital speakers by proxy 176, then the user must first select 178 the digital music file 156 from a Web server 172 with the Proxy Browser 148. Music files exist in standard formats, such as MPEG (Motion Picture Expert's Group) and MP3, a newer, more compact standard for multi-media files on the Internet. A user selects music files 156 from a Web server 172 to play on digital speakers 176 that may be remote from the Proxy Browser 148. Using the URL or IP address of each speaker 180, the Proxy Browser 148 directs the music file 156 to download to distributed speakers in, and play simultaneously on, each speaker 182. Each speaker has its own built-in computer processor, memory, and networking capability to connect to a LAN and the Internet. A sound file, like an MP3, can be either fully cached to a speaker's memory for playing after the entire file is received, or streamed into the speaker by partially caching the file in memory and played as the file is in the process of downloading. Each speaker's processor decodes the music file and sends instructions for playout 184. In a similar process, the user 148 with a Proxy Browser may select a movie file 158 from a Web server 172 to watch on a digital video player 186 or a home entertainment system. The selected movie file 158 downloads 188 to the URL address 190 of the video player 186 that is linked to the Internet 150. The video player 186 has its own built-in processor, memory that is coupled to the processor, and network interface to receive the streaming video file from the Internet, decode the digital file, cache the file, and control playout on a video screen 194.

The Proxy Browser can provide entertainment from the Internet through downloading game or multi-media files by proxy to a child's board game or toy. A board game 196 linked to the Web 150 with its own processor, memory coupled to the processor, and a URL or IP address, may receive new games, multi-players, strategies, and setups from associated game sites on the Internet 150 via the Proxy Browser 148. The user of a Proxy Browser 148 may also select a multi-media file 198 from a Web server 152 and knowing the URL or IP address of an Internet-enabled game, toy, or electronic book, command the server 152 to download the file 212 thereby animating story characters 204 or scenes.

In a further illustration of an exemplary preferred embodiment, a Web page in HTML format may also be designated by the Proxy Browser for download to a third-party PC. The user launches a Proxy Browser 148 session to scan the Internet 150 and find a Web page of interest, with an example filename of webpage.htm 164. The Web page 216 is selected 218 by the user who enters the receiving PC's URL/IP address. The Web page is sent from the Web server to a third-party client computer's Internet browser, such as Microsoft Internet Explorer or Netscape Navigator.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A system for proxy browsing the Internet, comprising:
a first computer linked to the Internet;
a Proxy Browser Internet interface program hosted on said Internet linked computer; and
an electronic appliance linked online to the Internet, wherein said electronic appliance comprises a unique Internet Protocol (IP) address, and said electronic appliance can actively receive electronic data transmissions from the Internet,
wherein said Proxy Browser transmits a command with said electronic appliance IP address through the Internet that directs an Internet server to transmit a remote digital file selected by said Proxy Browser program to said electronic appliance IP address without said electronic appliance communicating with said proxy browser, and said digital file executes on said electronic appliance without verification of said digital file execution by said proxy browser program; and
a digital speaker online to the Internet and associated with a unique IP address,
wherein said Proxy Browser program selects a digital music file from said Internet server and sends said command to download said digital music file to said digital speaker IP address, and
said music file is downloaded and played on a said digital speaker.

2. A system for proxy browsing the Internet according to claim 1, wherein said Proxy Browser Internet interface program identifies said remote digital file and identifies an IP address of said electronic appliance, and
said Internet server verifies said IP address and verifies a transmission of said remote digital file without interaction of said proxy browser program.

3. A system for proxy browsing the Internet according to claim 1, further comprising:
an embedded Internet server located in said electronic appliance comprising configuration data and operating status data for said electronic device.

4. A system for proxy browsing the Internet according to claim 1, wherein said configuration data is located within the Internet server.

5. The system of claim 1, wherein said Internet server transmits said remote digital file to said electronic appliance IP address without said verification of said IP address or said file transmission by said proxy browser program.

6. The system of claim 1, wherein said proxy browser program transmits a command to said Internet server that directs said server to transmit said remote digital file to a uniform resource locator address of said electronic appliance, said remote digital file transmission occurring without interaction or verification by said proxy browser program.

7. A system for proxy browsing the Internet according to claim 1, wherein said Proxy Browser program selects an Internet Web page, and
said Web page is downloaded by said server into an embedded Internet server on said electronic appliance.

8. A system for proxy browsing the Internet, comprising:
a first computer linked to the Internet;
a Proxy Browser Internet interface program hosted on said Internet linked computer; and
an electronic appliance linked online to the Internet, wherein said electronic appliance comprises a unique Internet Protocol (IP) address, and said electronic appliance can actively receive electronic data transmissions from the Internet,
wherein said Proxy Browser transmits a command with said electronic appliance IP address through the Internet that directs an Internet server to transmit a remote digital file selected by said Proxy Browser program to said electronic appliance IP address without said electronic appliance communicating with said proxy browser, and said digital file executes on said electronic appliance without verification of said digital file execution by said proxy browser program,
wherein said Proxy Browser program selects a digital video file from said Internet server, and
said Internet server downloads said digital video file onto a digital video player that is connected to the Internet.

9. A system for proxy browsing the Internet, comprising:
a first computer linked to the Internet;
a Proxy Browser Internet interface program hosted on said Internet linked computer; and
an electronic appliance linked online to the Internet, wherein said electronic appliance comprises a unique Internet Protocol (IP) address, and said electronic appliance can actively receive electronic data transmissions from the Internet, wherein said Proxy Browser transmits a command with said electronic appliance IP address through the Internet that directs an Internet server to transmit a remote digital file selected by said Proxy Browser program to said electronic appliance IP address without said electronic appliance communicating with said proxy browser, and said digital file executes on said electronic appliance without verification of said digital file execution by said proxy browser program, wherein said Proxy Browser selects a digital game configuration file from said Internet server, said digital configuration game file is downloaded to a game or toy that is linked to the Internet, and said game file reconfigures said game or toy to provide new scenarios and strategies for entertainment.

* * * * *